United States Patent
St. Clair

(10) Patent No.: US 9,535,596 B2
(45) Date of Patent: Jan. 3, 2017

(54) THREE-DIMENSIONAL GESTURES

(75) Inventor: Luke St. Clair, Redmond, WA (US)

(73) Assignee: Facebook, Inc., Menlo Park, CA (US)

( * ) Notice: Subject to any disclaimer, the term of this patent is extended or adjusted under 35 U.S.C. 154(b) by 77 days.

(21) Appl. No.: 13/557,868

(22) Filed: Jul. 25, 2012

(65) Prior Publication Data

US 2014/0028572 A1    Jan. 30, 2014

(51) Int. Cl.
*G06F 3/0488* (2013.01)

(52) U.S. Cl.
CPC ......... *G06F 3/0488* (2013.01); *G06F 3/04883* (2013.01); *G06F 2203/04101* (2013.01); *G06F 2203/04808* (2013.01)

(58) Field of Classification Search
USPC .......................................... 345/173; 715/863
See application file for complete search history.

(56) References Cited

U.S. PATENT DOCUMENTS

| | | | |
|---|---|---|---|
| 2010/0020035 A1* | 1/2010 | Ryu et al. | 345/173 |
| 2010/0295781 A1* | 11/2010 | Alameh et al. | 345/158 |
| 2011/0115821 A1* | 5/2011 | Huang et al. | 345/660 |
| 2011/0164029 A1* | 7/2011 | King et al. | 345/419 |
| 2012/0249443 A1* | 10/2012 | Anderson et al. | 345/173 |
| 2013/0055150 A1* | 2/2013 | Galor | 715/784 |

* cited by examiner

*Primary Examiner* — Sahlu Okebato
(74) *Attorney, Agent, or Firm* — Baker Botts L.L.P.

(57) ABSTRACT

In one embodiment, a method includes identifying a three-dimensional gesture made by a user of a computing device with respect to one or more surfaces of the computing device, the three-dimensional gesture comprising a trajectory in three dimensions, a first portion of the trajectory comprising a touch of one or more of the surfaces, a second portion of the trajectory comprising a series of points in space distant from the surfaces; determining a user input based on the three-dimensional gesture; and executing one or more actions based on the user input.

18 Claims, 14 Drawing Sheets

THREE-DIMENSIONAL GESTURES

TECHNICAL FIELD

This disclosure generally relates to user interface.

BACKGROUND

A touchpad is an input device including a surface that detects touch-based inputs of users. A touch screen is an electronic visual display that detects the presence and location of user touch inputs. A proximity sensor is a sensor device that detect the presence of nearby objects without physical contact. A computing system (such as a mobile phone, a tablet computer, or a laptop computer) often incorporate those devices to facilitate user interactions with application programs running on the computing system.

DESCRIPTION OF EXAMPLE EMBODIMENTS

A touchpad is an input device including a surface that detects touch-based inputs of users. Similarly, a touch screen is an electronic visual display surface that detects the presence and location of user touch inputs. So-called dual touch or multi-touch displays or touchpads refer to devices that can identify the presence, location and movement of more than one touch input, such as two- or three-finger touches. A system incorporating one or more touch-based input devices may monitor one or more touch-sensitive surfaces for touch or near touch inputs from a user. When one or more such user inputs occur, the system may determine the distinct area(s) of contact and identify the nature of the touch or near touch input(s) via geometric features and geometric arrangements (e.g., location, movement), and determine if they correspond to various touch events or gestures (e.g., tap, drag, swipe, pinch).

Figure 1:
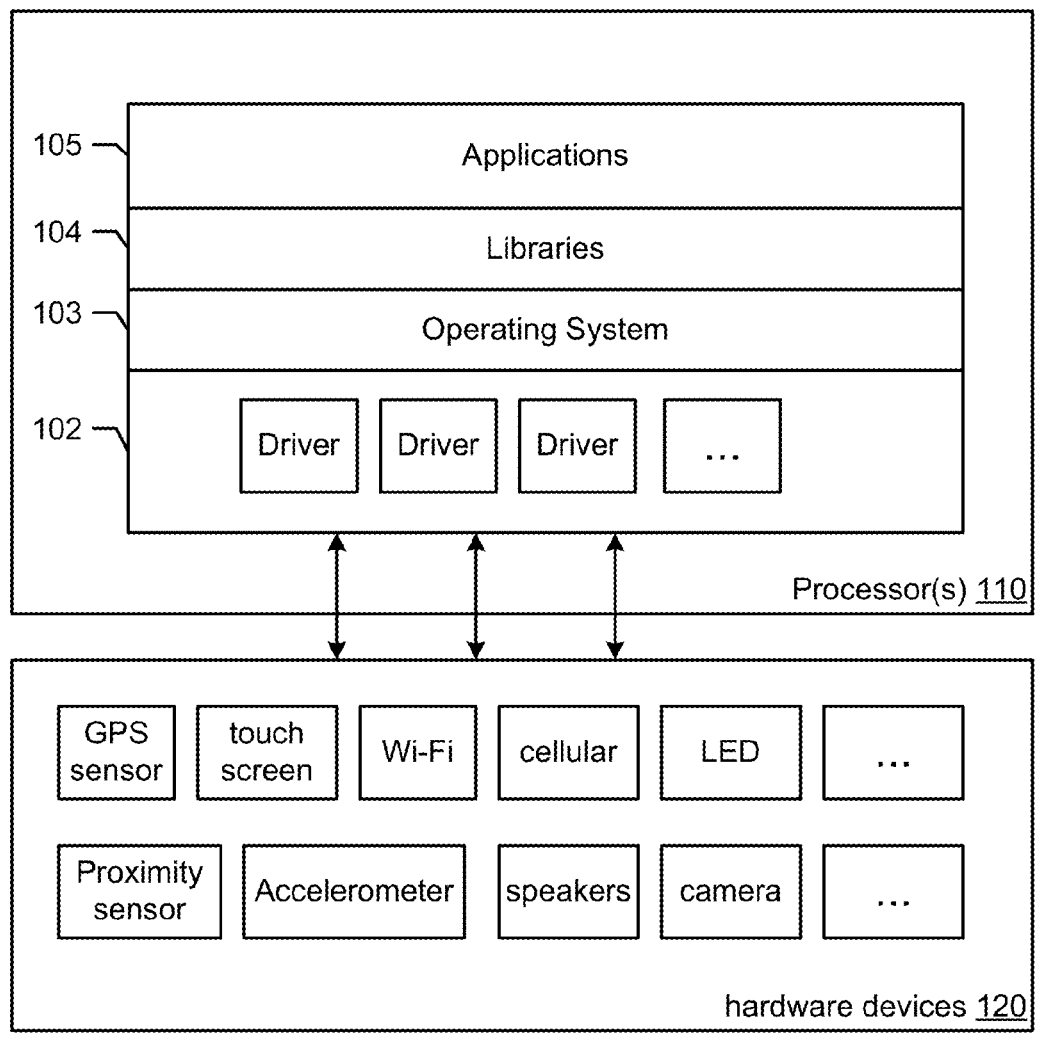
FIG. 1 illustrates an example processing stack of a mobile device.

Recognition of touch events by a system with one or more touch-based input devices—i.e., identifying one or more touch inputs by a user and determining corresponding touch event(s)—may be implemented by a combination of hardware, software, or firmware (or device drivers). FIG. 1 illustrates an example processing stack of a mobile device (e.g., a smart phone, a tablet computer). In the example of FIG. 1, the mobile device may comprise hardware devices (120) such as Input-Output (I/O) devices (e.g., a touch screen, speakers, a light-emitting diode or LED indicator, a camera, etc.), communication interface devices (e.g., a cellular interface, a Wi-Fi interface), sensors (e.g., a Global Positioning System or GPS sensor, a proximity sensor, an accelerometer, etc.), and other hardware devices. One or more device drivers in driver layer 102 hosted by one or more processors 110 of the mobile device can communicate and control the hardware devices. One or more processors 110 can execute various software programs, for example, operating system 103 running one or more application programs (e.g., web browser, address book, etc.) in applications 105 and managing one or more hardware devices via the one or more device drivers in driver layer 102. Libraries 104 can include one or more libraries used by one or more application programs in applications 105. For example, the mobile device may comprise one or more device drivers communicating with one or more touch-based input devices and detecting touch inputs. The system may comprise a touch gesture library containing touch event modules or computer program code for interpreting touch inputs detected by the device drivers to touch events or gestures. A program running on the mobile device can detect and process touch events by subscribing as listeners to touch event modules in the touch gesture library.

In addition to detecting touch or near-touch inputs using one or more touch input devices (e.g., touchpad, touch screen), a system may also detect a location and movement of an object at a distance away from the system's surface by incorporating one or more sensor or input devices. For example, a proximity sensor may detect the presence of nearby objects without physical contact. For example, a camera capturing a substantially real-time video may determine a distance and angle of an object (relative to the camera) in the video based on a focus distance and angle associated with the object. This disclosure contemplates any suitable sensors for detecting a location and movement of an object touching or at a distance away from the system's surface. A system incorporating one or more touch input devices, proximity sensors, or cameras may determine a location and movement of an object touching or at a distance away from the system's surface based on measurements of the object by the touch input devices, proximity sensors, or cameras (e.g., by using triangulation techniques). By continuously monitoring the touch input devices, proximity sensors, or cameras, the system may determine a three-dimensional trajectory of a moving object based on measurements of the object by the touch input devices, proximity sensors, or cameras. A user may provide inputs to the system by performing three-dimensional gestures. For example, a three-dimensional gesture may be the user's fingertip touching a front surface of the system and then pulling away from the front surface. When detecting such a three-dimensional user input, the system may determine a three-dimensional trajectory (e.g., of the user's fingertip), and determine if the three-dimensional trajectory corresponds to one or more three-dimensional gestures. The system may comprise a three-dimensional gesture library containing three-dimensional input modules or computer program code for calculating and interpreting three-dimensional input trajectories (detected by the touch input devices, proximity sensors, or cameras) to three-dimensional gestures. A program running on the system can detect and process three-dimensional gestures by subscribing as listeners to the three-dimensional input modules in the three-dimensional gesture library.

Figure 2:
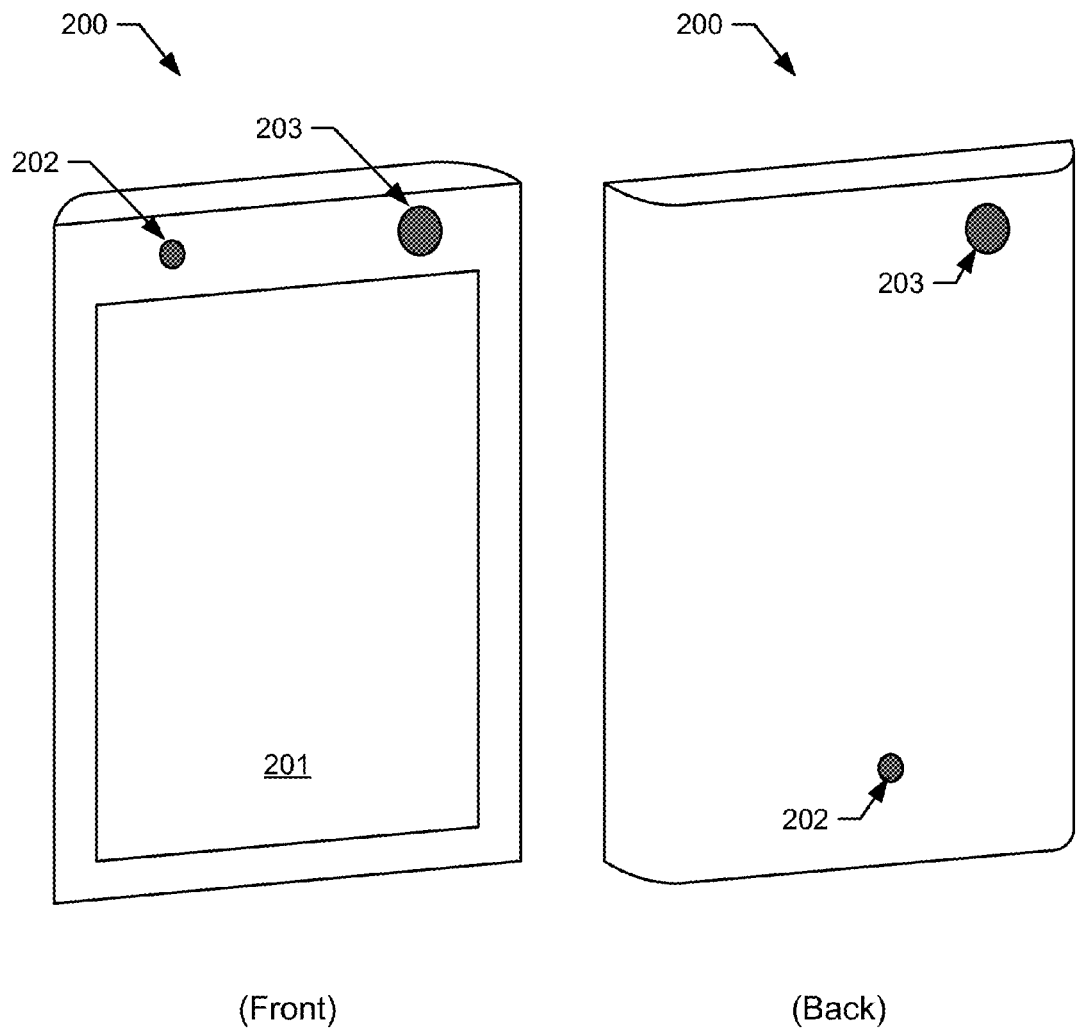
FIG. 2 illustrates an example mobile device.

FIG. 2 illustrates an example mobile device. In the example of FIG. 2, mobile device 200 may comprise a housing with a touch display 201 disposed on a front side of the housing. Touch display 201 may be a single-touch, dual-touch, or multi-touch display. Mobile device 200 may comprise one or more additional touch input devices (e.g., touchpad, touch screen) disposed on a back side of the housing. This disclosure contemplates any suitable placement of the additional touch input devices.

Mobile device 200 may comprise one or more proximity sensors 202 disposed on the front side and the back side of the device's housing as illustrated in FIG. 2. This disclosure contemplate any suitable number of proximity sensors at any suitable location of mobile device 200.

Mobile device 200 may comprise one or more cameras 203 disposed on the front side and the back side of the device's housing as illustrated in FIG. 2. This disclosure contemplate any suitable number of cameras at any suitable location of mobile device 200. For example, in one embodiment, mobile device 200 may have one cameras near the left edge and another camera near the right edge of the front side of the device's housing.

Mobile device 200 may comprise a touch gesture library containing touch event modules or computer code that can recognize touch inputs, and determine one or more corresponding touch events or gestures (e.g., tap, draft, swipe, pinch). One or more applications hosted by mobile device 200 may be configured to detect and respond to one or more touch events or gestures by subscribing as listeners to touch event modules in the touch gesture library.

Mobile device 200 may comprise a three-dimensional gesture library containing three-dimensional input modules or computer program code that can recognize three-dimensional inputs, and determine one or more corresponding three-dimensional gestures. One or more applications hosted by mobile device 200 may be configured to detect and respond to one or more three-dimensional inputs by subscribing as listeners to three-dimensional input modules in the three-dimensional gesture library.

Figure 3:
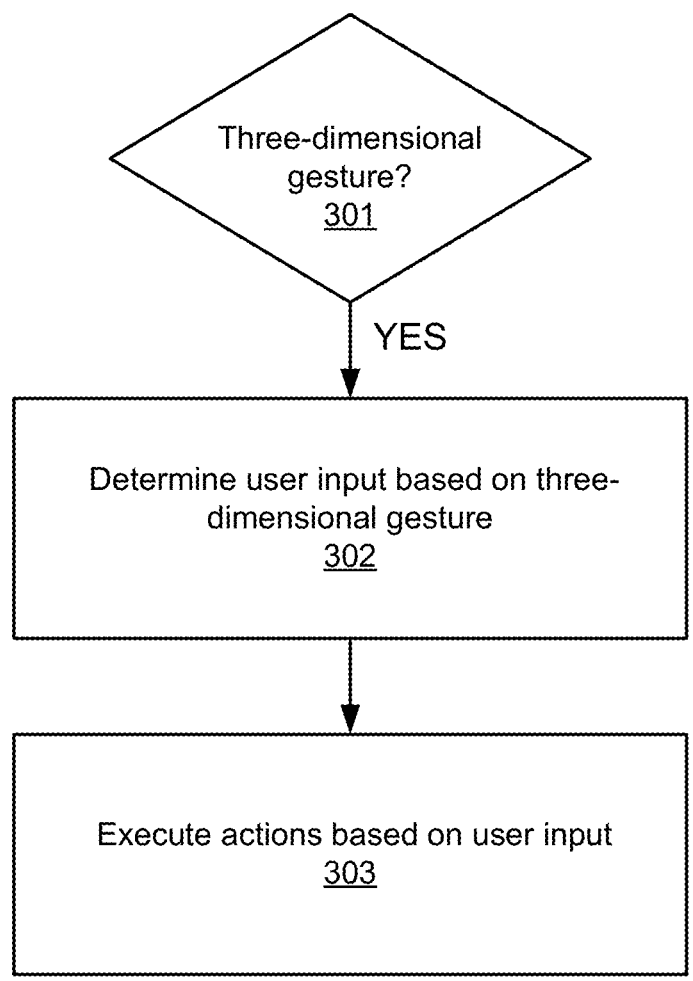
FIG. 3 illustrates an example method for providing user inputs with three-dimensional gestures.

Particular embodiments describe methods for providing user inputs with three-dimensional gestures. Particular embodiments may detect and recognize a three-dimensional gesture, determine a user input based on the three-dimensional gesture, and execute one or more actions based on the user input. FIG. 3 illustrates an example method for providing user inputs with three-dimensional gestures. The example method of FIG. 3 can be implemented by an application (or an operating system) running on one or more processors of a computing device. In particular embodiments, a computing device may be a client device comprising one or more touch input devices, proximity sensors, or cameras. The computing device may comprise any suitable input devices or sensors that each can determine a location or movement of an object. For example, a computing device may be a mobile phone, a tablet computer, a handheld gaming console, a remote control, or any suitable computing device comprising one or more touch input devices, proximity sensors, cameras, or any suitable input devices or sensors that each can determine a location or movement of an object. For example, a computing device may be mobile device 200 illustrated in FIG. 2. In particular embodiments, the application may identify a three-dimensional gesture made by a user with respect to one or more surfaces of the computing device (STEP 301). The application may detect and recognize the three-dimensional gesture by subscribing as listeners to the three-dimensional input modules as described earlier. In particular embodiments, the three-dimensional gesture comprises a trajectory in three dimensions. A first portion of the trajectory may comprise a touch of one or more of the surfaces, while a second portion of the trajectory may comprise a series of points in space distant from the surfaces.

Figure 4A:
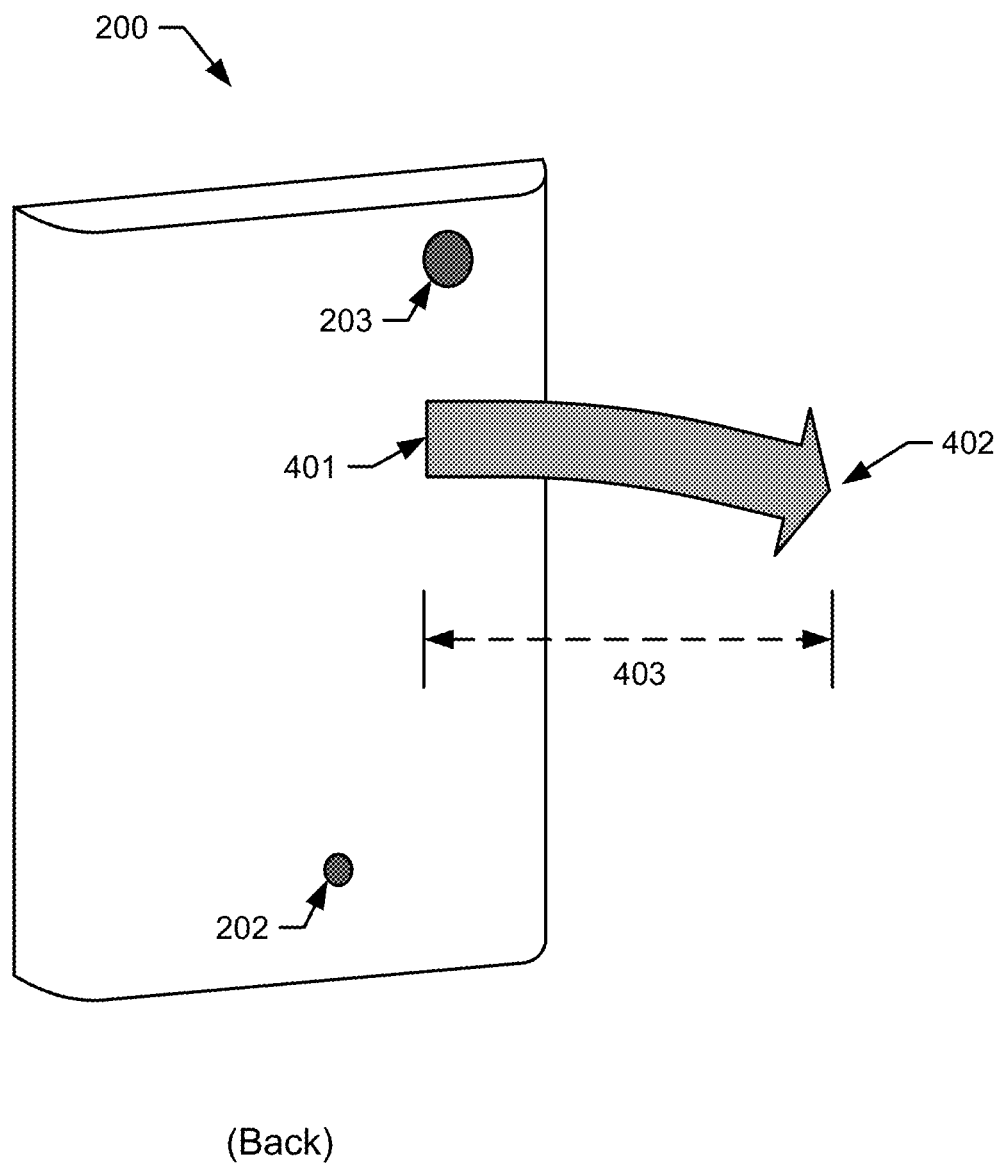
FIG. 4A illustrates an example three-dimensional gesture.

FIG. 4A illustrates an example three-dimensional trajectory of a pulling gesture. A user may perform a pulling gesture by touching on a surface of the computing device with a fingertip (or any suitable object) and then pulling (or lifting) the fingertip away from the surface. As illustrated by the arrow of FIG. 4A, a three-dimensional trajectory of the pulling gesture may start at a first location (401) on a particular surface of the computing device (e.g., the back side of mobile device 200), and end at an end point (402) at a distance from the particular surface of the computing device. This disclosure contemplates any suitable surface of the computing device where a pulling gesture starts.

Figure 4B:
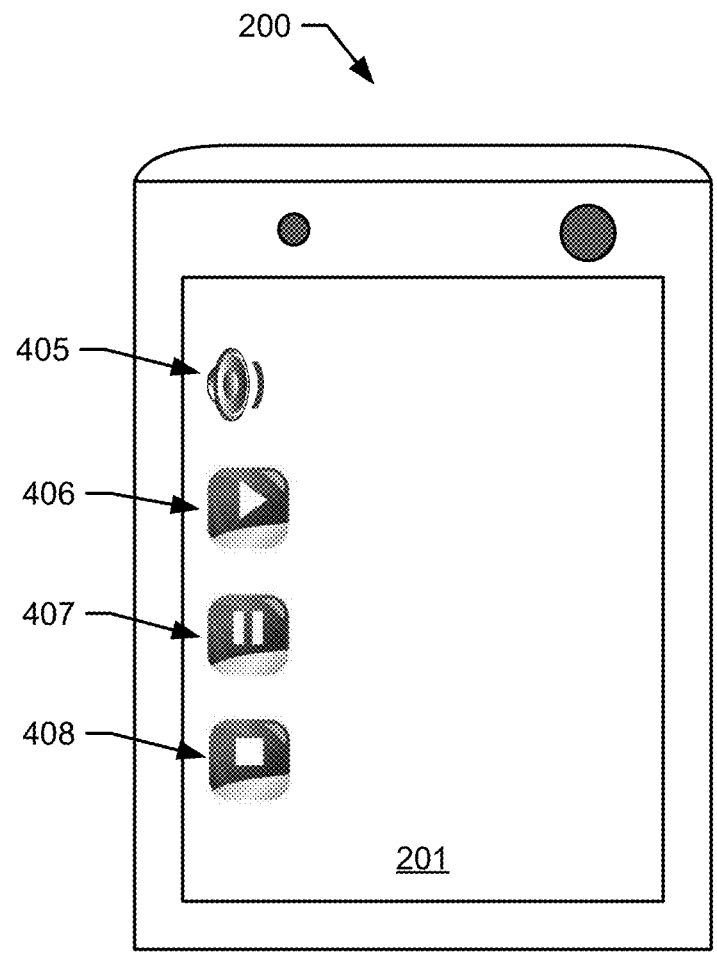
FIG. 4B illustrates an example user interface of a music player application.

In particular embodiments, the application may determine a user input based on the three-dimensional gestures (STEP 302). In particular embodiments, the application may execute one or more actions based on the user input (STEP 303). For example, the application may be a music player application running on mobile device 200. The music player application may display in touch display 201 user interface icons such as speaker volume adjustment 405, play 406, pause 407, and stop 408, as illustrated in FIG. 4B. For example, a user of the computing device may perform a pulling gesture as illustrated by the arrow in FIG. 4A. The music player application may identify the pulling gesture (e.g., by subscribing as a listener to the three-dimensional input modules as described earlier), and determine a user input for adjusting a user-controllable parameter of the music player application based on the pulling gesture. In particular embodiments, the application may select a user interface object at a location corresponding to the first location of the pulling gesture's trajectory, and adjust a user-controllable parameter of the application indicated by the user interface object. For example, corresponding to the first location 401 (at the back-side surface of mobile device 200) of the pulling gesture's trajectory illustrated in FIG. 4A, the music application may select speaker volume adjustment icon 405 that is displayed in touch screen 201 and is in the opposite side to the first location 401. The music player application may adjust speaker volume of the music player application, as indicated by volume adjustment icon 405. The application may adjust the user-controllable parameter based on a distance of the end point of the pulling gesture's trajectory away from the particular surface of the computing device. For example, the music player application may increase sound volume by 10 percent if the distance 403 (between the end point 402 and the back-side surface of mobile device 200 illustrated in FIG. 2A) is 1 centimeter, increase sound volume by 20 percent if the distance 403 is 2 centimeter, increase sound volume by 30 percent if the distance 403 is 3 centimeter, and so on.

In other embodiments, the pulling gesture illustrated by the arrow of FIG. 4A may cause an application to preview content corresponding to a user interface icon. For example, in response to the pulling gesture as illustrated by the arrow of FIG. 4A, an operating system of mobile device 200 may select a user interface icon (e.g., a photo gallery) displayed on touch screen 201 at a position opposite to the first location 401 (at the back-side surface of mobile device 200) of the pulling gesture's trajectory illustrated in FIG. 4A. The operating system may display content corresponding to the user interface icon (e.g., thumbnails of photos included in the photo gallery) in an overlay frame displayed in touch screen 201. The operating system may adjust a number of photo thumbnails displayed within the overlay frame (or a size of the overlay frame) based on a distance of the end point of the pulling gesture's trajectory away from the back-side surface of mobile device 200. For example, the operating system may display 4 photo thumbnails if the distance 403 (illustrated in FIG. 2A) is 1 centimeter, 8 photo thumbnails if the distance 403 is 2 centimeter, 16 photo thumbnails if the distance 403 is 3 centimeter, and so on.

In one embodiment, the application may adjust a user-controllable parameter without selecting a user interface object. For example, an operating system of mobile device 200 may adjust screen brightness of touch display 201 based on a user input of the pulling gesture illustrated in FIG. 4A. The operating system may identify a user performing a pulling gesture illustrated in FIG. 4A, and determine a user input for adjusting screen brightness for the operating system's user interface (e.g., a home screen) displayed in touch display 201. The operating system may decrease screen brightness of touch display 201 by 10 percent if the distance 403 (illustrated in FIG. 4A) is 0.5 inch, decrease screen brightness of touch display 201 by 20 percent if the distance 403 is 1 inch, and so on.

Figure 4C:
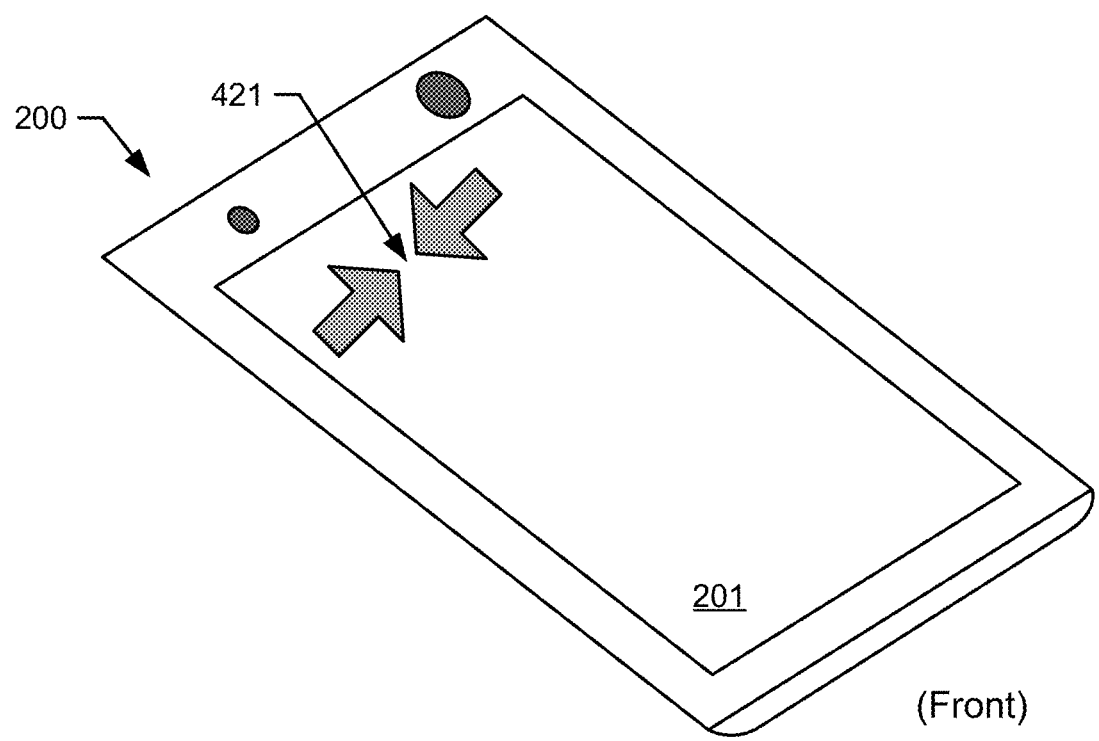
FIG. 4C-4F illustrate another example three-dimensional gesture.
Figure 4D:
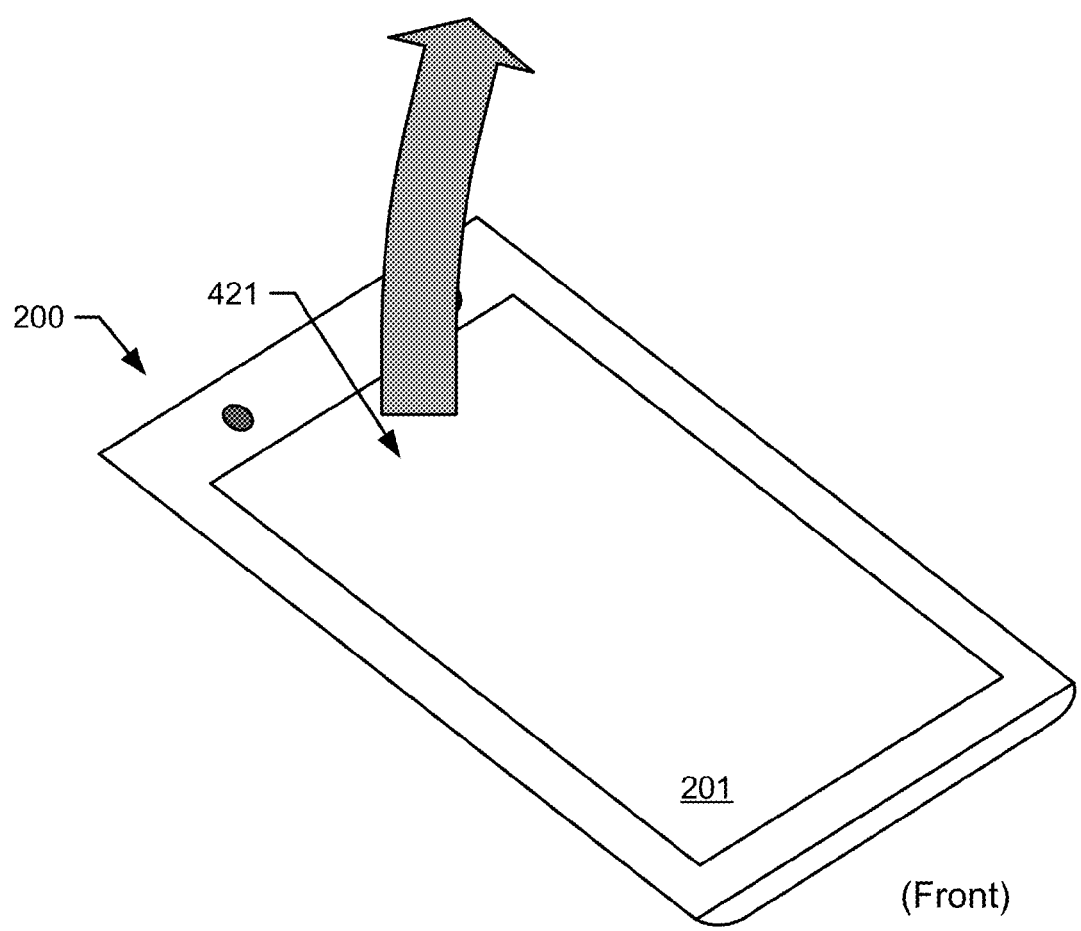
Figure 4E:
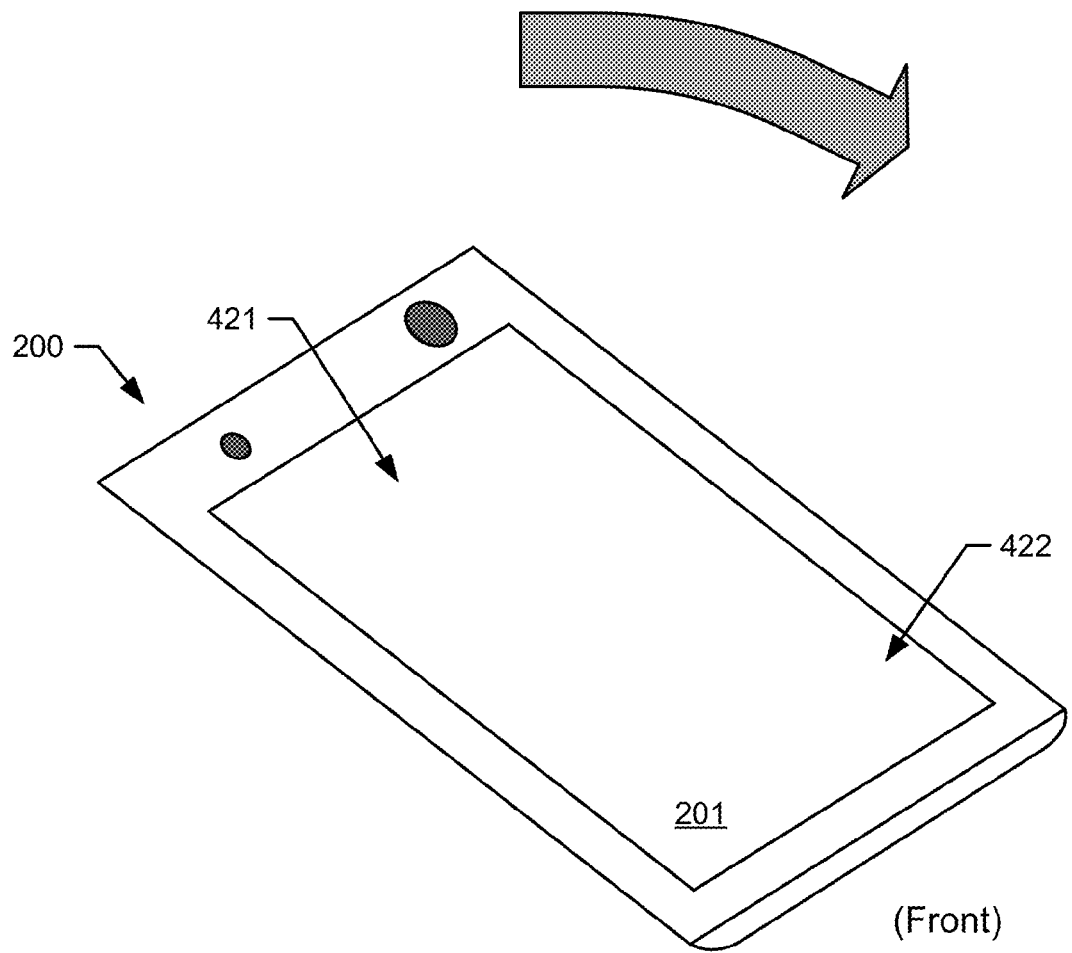
Figure 4F:
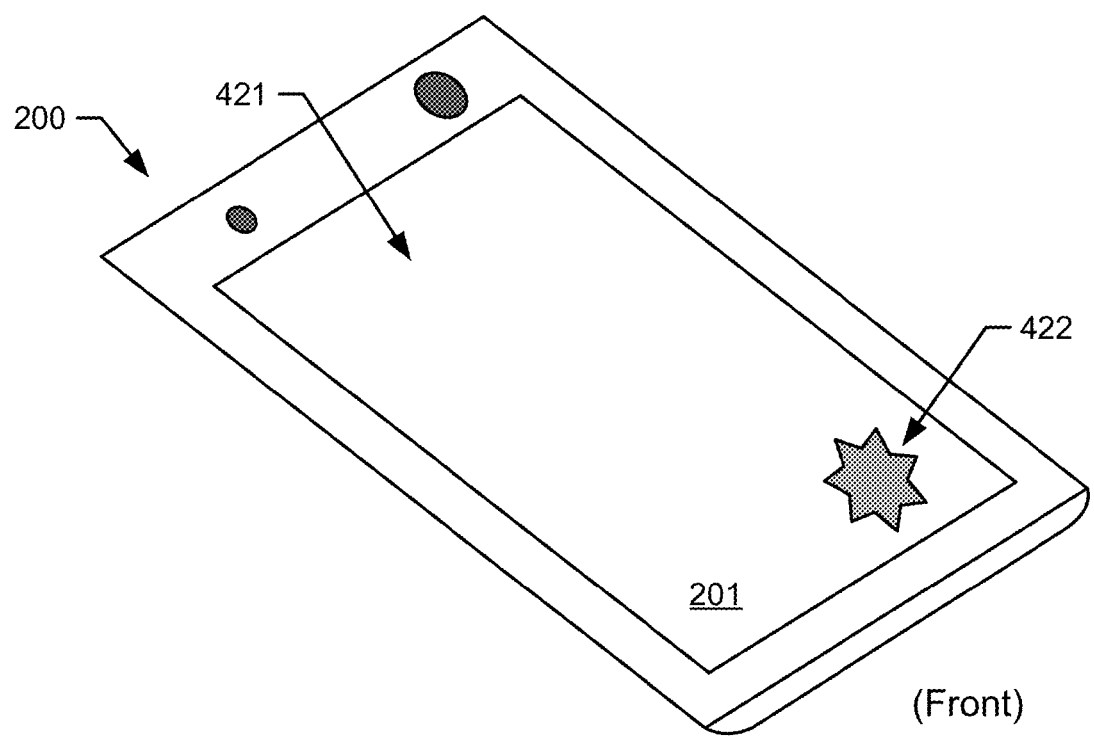
Figure 4G:
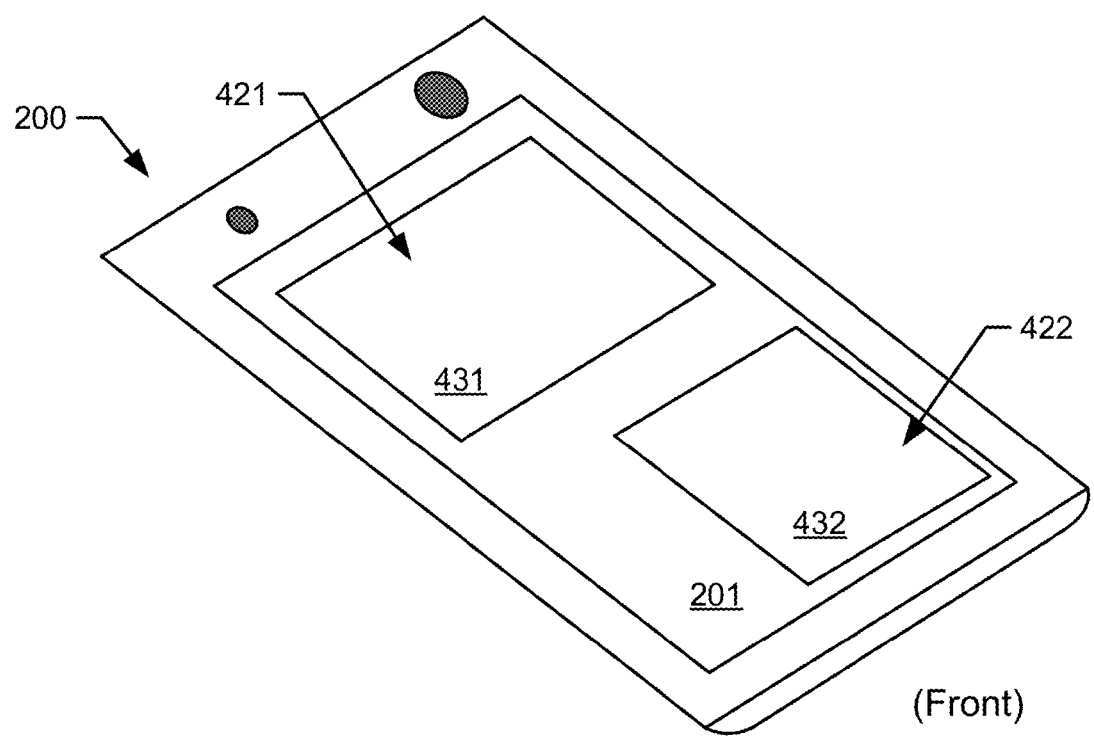
FIG. 4G illustrates an example user interface.

FIGS. 4C-4F illustrate an example three-dimensional trajectory of another example three-dimensional gesture for the example method of FIG. 3. In particular embodiments, a user may perform a pinching gesture at a first location 421 on touch screen 201 of mobile device 200, as illustrated in FIG. 4C. The user may perform a pulling gesture away from first location 401 on touch screen 201, as illustrated by the arrow in FIG. 4D. The user may perform a movement distant from and across touch screen 201 toward a second location 422 of touch screen 201 (as illustrated by the arrow in FIG. 4E), and perform a dropping gesture on touch screen 201 at second location 422 (as illustrated by the star in FIG. 4F). A dropping gesture may be a tap gesture on touch screen 201. An application (or an operating system) running on mobile device 200 may detect and recognize (e.g., by subscribing as listeners to the three-dimensional input modules as described earlier) the three-dimensional trajectory illustrated in FIGS. 4C-4F as a pick-up-move-drop-down gesture (STEP 301). The application may determine a user input for drag-and-drop based on the pick-up-move-drop-down gesture (STEP 302). The application may, based on the user input of drag-and-drop, drag and drop a user interface object displayed in touch screen 201 from a first point corresponding to first location 421 to a second point corresponding to second location 422 (STEP 303). The user interface object may be an icon, a frame, a selectable picture, or any suitable user interface object. In one embodiment, an operating system may, based on the user input of drag-and-drop, drag and drop a user interface object display in touch screen 201 from a first point corresponding to first location 421 and within a first window of a first application (e.g., window 431 as illustrated in FIG. 4G), to a second point corresponding to second location 422 and within a second window of a second application (e.g., window 432 as illustrated in FIG. 4G). That is, the operating system may drag the user interface object from the first application's user interface and drop the user interface object to the second application's user interface.

Note that the pick-up-move-drop-down gesture illustrated in FIGS. 4C-4G may comprise a pinching gesture at first location 421 on touch screen 201, followed by a tap gesture at second location 422 on touch screen 201 within a specified period of time (e.g., within 1.5 seconds). That is, the pick-up-move-drop-down gesture illustrated in FIGS. 4C-4G may be detected by one or more touch input devices (e.g., touch screen 201), without triangulating measurement data from other sensors such as a camera or a proximity sensor. An application (or an operating system) running on mobile device 200 may detect and recognize the pick-up-move-drop-down gesture illustrated in FIGS. 4C-4G by subscribing as listeners to touch event modules as described earlier.

This disclosure contemplates any suitable surface of mobile device 200 where a pick-up-move-drop-down gesture starts and ends. For example, a user may perform a pick-up-move-drop-down gesture by performing a pinching gesture at a first location on the back-side surface of mobile device 200, a pulling gesture away from the first location on the back-side surface, a movement distant from and across the back-side surface toward a second location of the back-side surface, and a dropping gesture on the back-side surface at the second location. An application (or an operation system) running on mobile device 200 may detect and recognize the pick-up-move-drop-down gesture by subscribing as listeners to the three-dimensional input modules as described earlier (STEP 301). The application may determine a drag-and-drop user input based on the pick-up-move-drop-down gesture (STEP 302). The application may identify a first point on touch screen 201 that is opposite to the first location on the back-side surface for the pick-up-move-drop-down gesture. The application may identify a second point on touch screen 201 that is opposite to the second location on the back-side surface for the pick-up-move-drop-down gesture. The application may, based on the drag-and-drop user input, drag and drop a user interface object display in touch screen 201 from the first point within touch screen 201 to the second point within touch screen 201 (STEP 303).

Figure 4H:
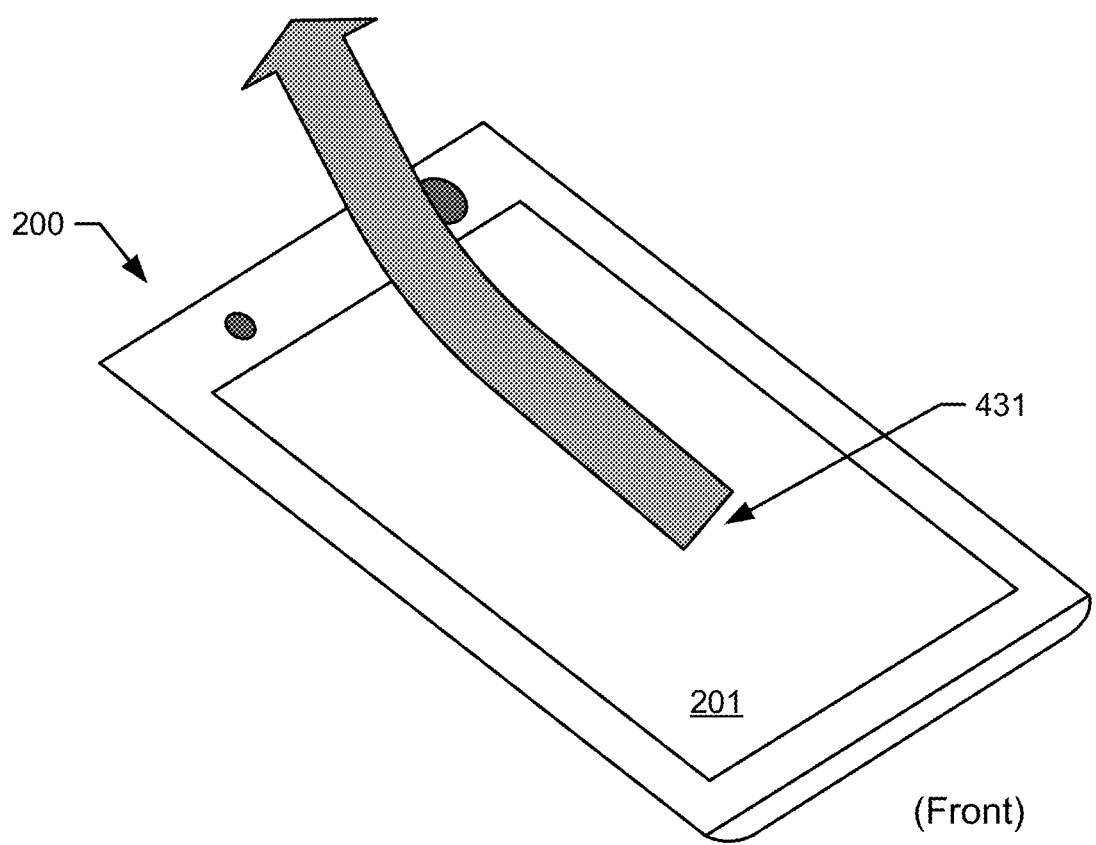
FIG. 4H illustrates yet another example three-dimensional gesture.

FIG. 4H illustrates an example three-dimensional trajectory of yet another example three-dimensional gesture for the example method of FIG. 3. In particular embodiments, a user may perform a sliding gesture with his fingertip from a starting point 431 on touch screen 201, and lift his fingertip away from touch screen 201 while following though on the sliding gesture, as illustrated by the arrow in FIG. 4H. An application (or an operating system) running on mobile device 200 may detect and recognize (e.g., by subscribing as listeners to the three-dimensional input modules as described earlier) the three-dimensional trajectory illustrated by the arrow in FIG. 4H as a fly-away gesture (STEP 301). The application may determine a fast-scrolling input based on the fly-away gesture (STEP 302). The application may, based on the fast-scrolling input, select scrollable user interface object (e.g., a scroll bar, a scrollable web page) at or near starting point 431 of the fly-away gesture, and scroll the scrollable user interface object at a speed based at least in part on a velocity of the fly-away gesture (STEP 303). For example, a user may perform with his fingertip a fly-away gesture illustrated in FIG. 4H on a scrollable web page displayed in touch screen 201 by a web browser. The user's fingertip may move at a slower speed (e.g., 1 inch per second) while sliding on touch screen 201, and at a higher speed (e.g., 5 inches per second) after lifting (or flicking) away from touch screen 201. In response to the fly-away gesture performed by the user's fingertip, the web browser may scroll the scrollable web page at the same pace with the user's fingertip sliding on touch screen 201 (e.g., 1 inch per second), and scroll at a higher speed (e.g., 5 inches per second) after the user's fingertip flicking away from touch screen 201.

Particular embodiments may repeat the steps of the method of FIG. 3, where appropriate. Moreover, although this disclosure describes and illustrates particular steps of the method of FIG. 3 as occurring in a particular order, this disclosure contemplates any suitable steps of the method of FIG. 3 occurring in any suitable order. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

In particular embodiments, an application (or an operating system of the computing device) may store in a local storage of the computing device, a user preference file comprising user-specific data for the feature of user inputs with three-dimensional gestures as illustrated by the example method of FIG. 3. For example, a user of the computing device may turn on or off the feature of user inputs with three-dimensional gestures for the application, causing the application to store the user's preference (e.g., the feature is turned off) in the user preference file. For another example, the application may use a machine learning algorithm to dynamically improve the accuracy of recognition of a user's three-dimensional gestures, while storing in the user preference file training data for the machine learning algorithm. In particular embodiments, the application may transmit and store the user preference file in a remote server over the Internet (i.e., the user preference file is hosted in the "cloud"). In particular embodiments, the user may access the user preference file (stored in the remote server over the Internet) from another computing device of the user. That is, the user preference file may be synchronized among some or all of the user's computing devices. For example, the user may turn off (from being turned on) the feature of user inputs with three-dimensional gestures for the application on the user's mobile phone, causing the application to store the change in the local and remote copies of the user preference file. As the user accesses the user's tablet computer, an application (or an operating system) running on the tablet computer may access the user preference file stored in the remote server and turn off the feature of user inputs with three-dimensional gestures accordingly. Although this disclosure describes or illustrates particular features being synchronized among multiple computing devices of a user, this disclosure contemplates synchronizing any suitable number of any suitable features among any suitable computing devices of the user (e.g. by using user preference files as described above). For another example, the user may acquire a new mobile phone. An application or operating system running on the new mobile phone may access the user preference file stored in the remote server for the training data from the user's existing (or previously owned) mobile phone (or another computing device). Based on the training data, the application on the new mobile phone may accurately recognize the user's three-dimensional gestures, without further utilizing the machine learning algorithm.

In some embodiments, the feature of user inputs with three-dimensional gestures (as illustrated by the example method of FIG. 3) may be turned on or off on the user's computing device based on activities of the user's social contacts in a social-networking system. For example, the feature of user inputs with three-dimensional gestures on a user's computing device may be turned on if a number of the user's social contacts within a specified social distance (e.g., two degrees or separation) exceeds a specified threshold (e.g., 10). For example, a user preference file (for the feature of user inputs with three-dimensional gestures) described above may be stored with a corresponding user node in the social graph of the social-networking system. An application on a particular user's computing device may access the social graph, determine that more than 10 of the particular user's first- and second-degree friends have the feature activated (turned on) on their respective computing devices, and turn on the feature on the particular user's computing device accordingly. The application may make a suggestion (within its user interface) to the particular user about the feature, and turn on the feature based on the user's confirmation. That is, the particular user may "discover" the feature of user inputs with three-dimensional gestures, if more than 10 of his first- and second-degree friends having the feature activated on their respective computing devices. Moreover, this disclosure contemplates any suitable feature that may be turned on or off on a user's computing device based on activities of the user's social contacts in the social-networking system (e.g., by using user preference files stored in the social graph as described above). The social-networking system and social graph are described later.

A social-networking system, such as a social-networking website, may enable its users to interact with it and with each other through it. The social-networking system may create and store a record (such as a user profile) associated with the user. The user profile may include demographic information on the user, communication-channel information for the user, and personal interests of the user. The social-networking system may also create and store a record of the user's relationships with other users in the social-networking system (e.g. a social graph), as well as provide social-networking services (e.g. wall-posts, photo-sharing, or instant-messaging) to facilitate social interaction between or among users in the social-networking system.

A social-networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social-networking system. A user may be an individual (human user), an entity (e.g., an enterprise, business, or third party application), or a group (e.g., of individuals or entities). A user node corresponding to a user may comprise information provided by the user and information gathered by various system, including the social-networking system. For example, the user may provide his name, profile picture, city of residence, contact information (e.g., a phone number, an email address), birth date, gender, marital status, family status, employment, education background, preferences, interests, and other demographical information to be included in the user node. Each user node of the social graph may correspond to a web page (typically known as a profile page). For example, in response to a request including a user name, the social-networking system can access a user node corresponding to the user name, and construct a profile page including the name, a profile picture, and other information associated with the user. A concept node may correspond to a concept of the social-networking system. For example, a concept can represent a real-world entity, such as a movie, a song, a sports team, a celebrity, a restaurant, or a place or a location. An administrative user of a concept node corresponding to a concept may create the concept node by providing information of the concept (e.g., by filling out an online form), causing the social-networking system to create a concept node comprising information associate with the concept. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social-networking system can access a concept node corresponding to the name, and construct a web page including the name and other information associated with the concept. An edge between a pair of nodes may represent a relationship between the pair of nodes. For example, an edge between two user nodes can represent a friendship between two users. For example, the social-networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social-networking system a request to create an edge between a user node of the user and a concept node of the concept, indicating a relationship between the user and the concept (e.g., the user checks in a restaurant, or the user likes a celebrity). In addition, the degree of separation between any two nodes is defined as the minimum number of hops required to traverse the social graph from one node to the other. A degree of separation between two nodes can be considered a measure of relatedness between the users or the concepts represented by the two nodes in the social graph.

A social-networking system may support a variety of applications, such as photo sharing, on-line calendars and events, instant messaging, and advertising. For example, the social-networking system may also include media sharing capabilities. For example, the social-networking system may allow users to post photographs and other multimedia files to a user's profile page (typically known as wall posts) or in a photo album, both of which may be accessible to other users of the social-networking system. The social-networking system may also allow users to configure events. For example, a first user may configure an event with attributes including time and date of the event, location of the event and other users invited to the event. The invited users may receive invitations to the event and respond (such as by accepting the invitation or declining it). Furthermore, the social-networking system may allow users to maintain a personal calendar. Similarly to events, the calendar entries may include times, dates, locations and identities of other users.

Figure 5:
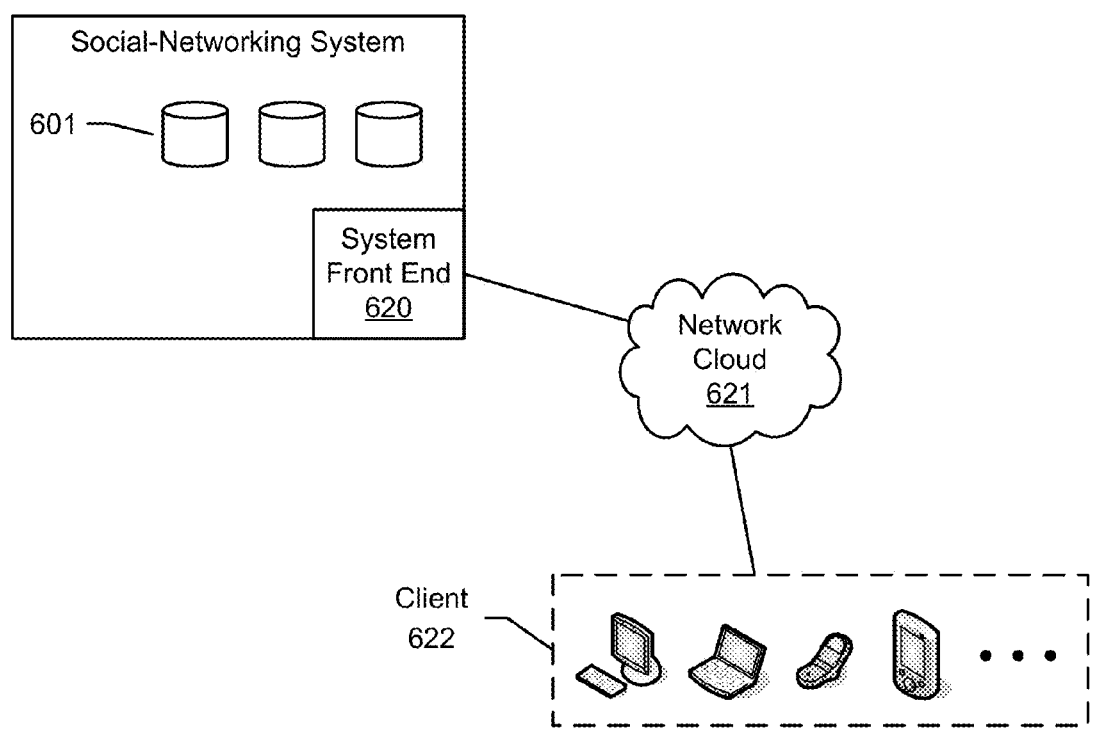
FIG. 5 illustrates an example network environment of a social-networking system.

FIG. 5 illustrates an example network environment of a social-networking system. In particular embodiments, a social-networking system may comprise one or more data stores 601. For example, each data store 601 may comprise one or more storage devices. In particular embodiments, the social-networking system may store in data stores 601 a social graph comprising user nodes, concept nodes, and edges between nodes as described earlier. Each user node may comprise one or more data objects corresponding to information associated with a user. Each concept node may comprise one or more data objects corresponding to information associated with a concept. Each edge between a pair of nodes may comprise one or more data objects corresponding to information associated with a relationship between users (or between a user and a concept, or between concepts) corresponding to the pair of nodes.

In particular embodiments, the social-networking system may comprise one or more computing devices (e.g., servers) hosting functionality directed to operation of the social-networking system. In particular embodiments, one or more of data stores 601 may be operably connected to the social-networking system's front end 620. A user of the social-networking system may access the social-networking system using a client device such as client device 622. In particular embodiments, front end 620 may interact with client device 622 through network cloud 621. For example, front end 620 may be implemented in software programs hosted by one or more computing devices of the social-networking system. Front end 620 may include web or HTTP server functionality, as well as other functionality, to allow users to access the social-networking system.

Client device 622 may be a desktop computer, laptop computer, tablet computer, personal digital assistant (PDA), in- or out-of-car navigation system, smart phone or other cellular or mobile phone, or mobile gaming device, among other suitable computing devices. Client device 622 may execute one or more client applications, such as a web browser (e.g., Microsoft Windows Internet Explorer, Mozilla Firefox, Apple Safari, Google Chrome, and Opera, etc.) or special-purpose client application (e.g., Facebook for iPhone, etc.), to access and view content over a computer network.

Network cloud 621 may represent a network or collection of networks (such as the Internet, a corporate intranet, a virtual private network, a local area network, a wireless local area network, a cellular network, a wide area network, a metropolitan area network, or a combination of two or more such networks) over which client devices 622 may access the social network system.

In particular embodiments, the social-networking system may store in data stores 601 data associated with applications and services provided by the social-networking system. In particular embodiments, the social-networking system may store user event data in data stores 601. For example, a user may register a new event by accessing a client application to define an event name, a time and a location, and cause the newly created event to be stored (e.g., as a concept node) in data stores 601. For example, a user may register with an existing event by accessing a client application to confirming attending the event, and cause the confirmation to be stored in data stores 601. For example, the social-networking system may store the confirmation by creating an edge in a social graph between a user node corresponding to the user and a concept node corresponding to the event, and store the edge in data stores 601.

Figure 6:
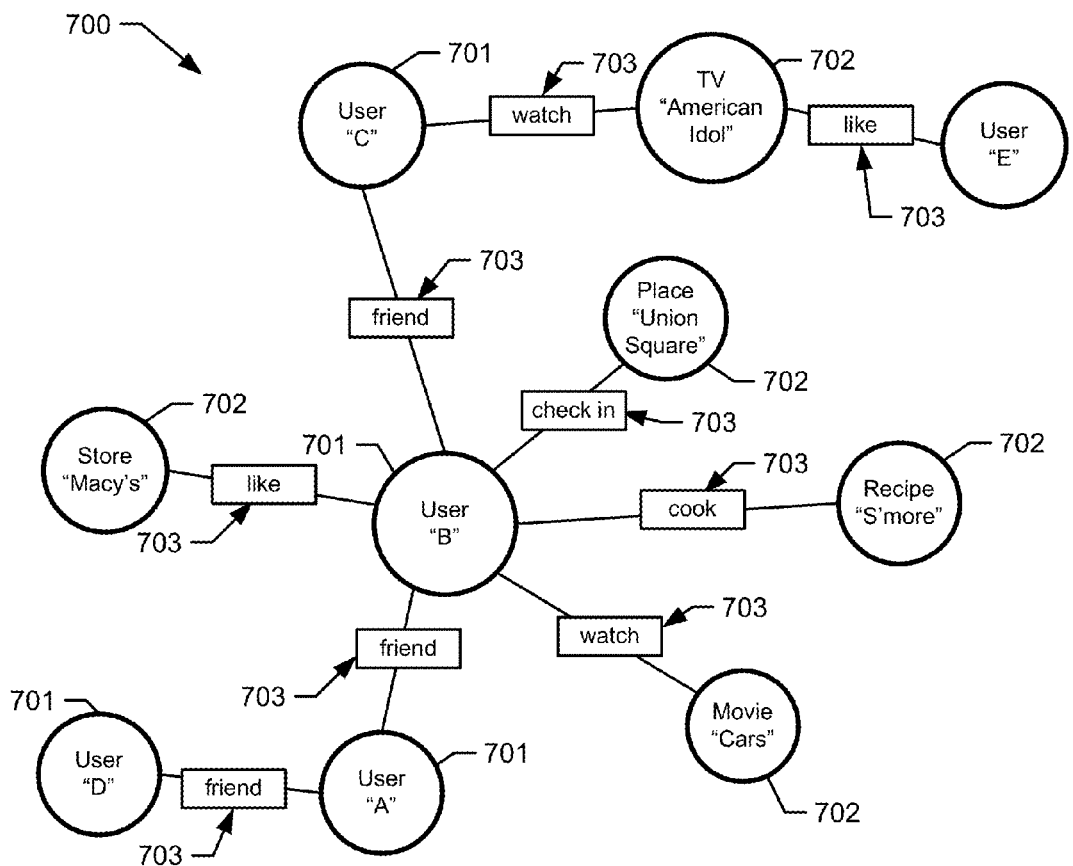
FIG. 6 illustrates an example social graph

FIG. 6 illustrates an example social graph 700. In the example of FIG. 6, social graph 700 may include user nodes 701, concept nodes 702, and edges 703 between nodes. An edge 703 between a pair of nodes may represent a relationship (or an action) between the pair of nodes. For example, user "B" is a friend of user "A" and user "C", respectively, as illustrated by the edges between users nodes "B" and "A", and between users nodes "B" and "C." For example, users "C" watches TV show "American Idol", as illustrated by the edges between the "American Idol" concept node and user nodes "C." Similarly, the edge between the user node "B" and the concept node "Macy's" may indicate that user "B" likes "Macy's." The edge between user node "B" and the "Cars" concept node indicates that user "B" watches the movie "Cars." The edge between user node "B" and the "S'more" concept node indicates that user "B" cooks the recipe "S'more." The edge between user node "B" and the "Union Square" concept nodes indicates that user "B" checks in to "Union Square." The edge between user node "E" and the "American Idol" concept node indicates that user "E" likes TV show "American Idol." Note that a social graph can be much larger than social graph 700 illustrated in FIG. 6. For example, a social graph used by Facebook of Menlo Park, Calif. can have a number of nodes in the order of $10^8$, and a number of edges in the order of $10^{10}$.

As described earlier, an edge between a pair of nodes may indicate a direct relationship between the pair of nodes. It is also desirable to determine likelihood of a relationship or an interest between a pair of nodes that are two or more hops away. For example, the social-working system may provide (e.g., via an email or a wall-post) a recommendation (e.g., an advertisement) for "Macy's" to user "B", given the direct relationship represented by the edge between the user node "B" and the concept node "Macy's" as illustrated in FIG. 6. The social-networking system may also provide a recommendation for "Macy's" to first-degree friends of user "B" (e.g., users "C" and "A") as first-degree friends often share comment interests.

Figure 7:
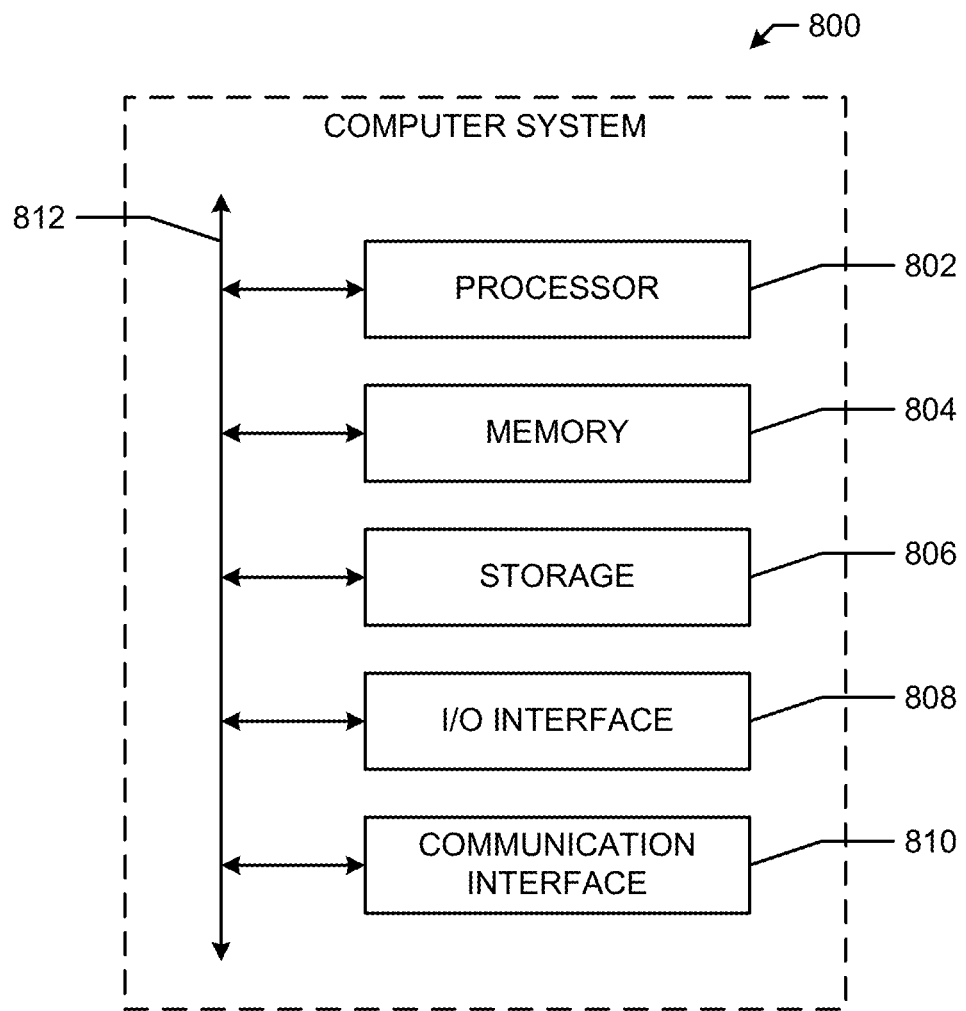
FIG. 7 illustrates an example computer system.

FIG. 7 illustrates an example computer system 800, which may be used with some embodiments of the present invention. This disclosure contemplates any suitable number of computer systems 800. This disclosure contemplates computer system 800 taking any suitable physical form. As example and not by way of limitation, computer system 800 may be an embedded computer system, a system-on-chip (SOC), a desktop computer system, a mobile computer system, a game console, a mainframe, a mesh of computer systems, a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. In particular embodiments, memory 804 includes main memory for storing instructions for processor 802 to execute or data for processor 802 to operate on. As an example and not by way of limitation, computer system 800 may load instructions from storage 806 to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM).

In particular embodiments, storage 806 includes mass storage for data or instructions. As an example and not by way of limitation, storage 806 may include an HDD, a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), or flash memory or a combination of two or more of these.

In particular embodiments, I/O interface 808 includes hardware, software, or both providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, microphone, display, touch screen, mouse, speaker, camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) for communicating with an Ethernet or other wire-based network or a wireless NIC (WNIC) for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (e.g., a BLUETOOTH WPAN), a WI-FI network (e.g., a 802.11a/b/g/n WI-FI network,), a WI-MAX network, a cellular network (e.g., a Global System for Mobile Communications (GSM) network, a Long Term Evolution (LTE) network), or other suitable wireless network or a combination of two or more of these.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an INFINIBAND interconnect, a low-pin-count (LPC) bus, a memory bus, a Peripheral Component Interconnect Express or PCI-Express bus, a serial advanced technology attachment (SATA) bus, a Inter-Integrated Circuit (I2C) bus, a Secure Digital (SD) memory interface, a Secure Digital Input Output (SDIO) interface, a Universal Serial Bus (USB) bus, a General Purpose Input/Output (GPIO) bus, or another suitable bus or a combination of two or more of these. Bus 812 may include one or more buses 812, where appropriate.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   identifying, by a computing device, a gesture made by a user of the computing device with respect to one or more surfaces of the computing device, the gesture being independent of any object displayed by the computing device, and the gesture comprising a single trajectory in three dimensions including:
   an earlier portion of the single trajectory in a first direction along at least one of the surfaces, the earlier portion comprising a first series of points touching the at least one of the surfaces, wherein the first series of points was detected using a first sensor of the computing device; and
   immediately following the earlier portion of the single trajectory, a later portion of the single trajectory in a second direction, the later portion comprising a second series of points increasingly distant from the surfaces, wherein the second direction comprises a deflection from the first direction that follows through on the earlier portion of the single trajectory, and wherein the second series of points was detected using a second sensor of the computing device;
   determining, by the computing device, a user input based at least in part on a speed of the gesture along the earlier portion of the single trajectory and a speed of the gesture along the later portion of the single trajectory, the user input being determined independent of a location corresponding to the series of points touching the surfaces; and
   executing, by the computing device, one or more actions based on the user input.

2. The method of claim 1, wherein the gesture is identified using a proximity sensor, camera, or touch sensor of the computing device.

3. The method of claim 1, wherein:
   the gesture comprises a pulling gesture on and then away from one of the surfaces at a first location of the one of the surfaces; and
   the actions comprise:
   selecting a user interface (UI) object within a display of the computing device at a first point within the display corresponding to the first location; and
   adjusting a user-controllable parameter of an application on the computing device indicated by the UI object based on a distance of an end point of the pulling gesture away from the one of the surfaces.

4. The method of claim 3, wherein the user-controllable parameter is a speaker volume or a display brightness.

5. The method of claim 1, wherein:
   the gesture is a fly-away gesture; and
   the actions comprise:
   selecting a scrollable user interface (UI) object at or near a starting point of the fly-away gesture; and
   scrolling the scrollable UI object at a speed based at least in part on a velocity of the fly-away gesture.

6. The method of claim 1, wherein the computing device is a mobile computing device.

7. One or more computer-readable non-transitory storage media embodying software that is operable when executed to:
   identify a gesture made by a user of a computing device with respect to one or more surfaces of the computing device, the gesture being independent of any object displayed by the computing device, and the gesture comprising a single trajectory in three dimensions including:
   an earlier portion of the single trajectory in a first direction along at least one of the surfaces, the earlier portion comprising a first series of points touching the at least one of the surfaces, wherein the first series of points was detected using a first sensor of the computing device; and immediately following the earlier portion of the single trajectory, a later portion of the single trajectory in a second direction, the later portion comprising a second series of points increasingly distant from the surfaces, wherein the second direction comprises a deflection from the first direction that follows through on the earlier portion of the single trajectory, and wherein the second series of points was detected using a second sensor of the computing device;

determine a user input based at least in part on a speed of the gesture along the earlier portion of the single trajectory and a speed of the gesture along the later portion of the single trajectory, the user input being determined independent of a location corresponding to the series of points touching the surfaces; and execute one or more actions based on the user input.

8. The media of claim 7, wherein the gesture is identified using a proximity sensor, camera, or touch sensor of the computing device.

9. The media of claim 7, wherein:
the gesture comprises a pulling gesture on and then away from one of the surfaces at a first location of the one of the surfaces; and
the actions comprise:
selecting a user interface (UI) object within a display of the computing device at a first point within the display corresponding to the first location; and
adjusting a user-controllable parameter of an application on the computing device indicated by the UI object based on a distance of an end point of the pulling gesture away from the one of the surfaces.

10. The media of claim 9, wherein the user-controllable parameter is a speaker volume or a display brightness.

11. The media of claim 7, wherein:
the gesture is a fly-away gesture; and
the actions comprise:
selecting a scrollable user interface (UI) object at or near a starting point of the fly-away gesture; and
scrolling the scrollable UI object at a speed based at least in part on a velocity of the fly-away gesture.

12. The media of claim 7, wherein the computing device is a mobile computing device.

13. A device comprising:
one or more processors; and
one or more computer-readable non-transitory storage media coupled to the processors and embodying software that is operable when executed by the processors to:
identify a gesture made by a user of the device with respect to one or more surfaces of the device, the gesture being independent of any object displayed by the computing device, and the gesture comprising a single trajectory in three dimensions including:
an earlier portion of the single trajectory in a first direction along at least one of the surfaces, the earlier portion comprising a first series of points touching the at least one of the surfaces, wherein the first series of points was detected using a first sensor of the computing device; and
immediately following the earlier portion of the single trajectory, a later portion of the single trajectory in a second direction, the later portion comprising a second series of points increasingly distant from the surfaces, wherein the second direction comprises a deflection from the first direction that follows through on the earlier portion of the single trajectory, and wherein the second series of points was detected using a second sensor of the computing device;

determine a user input based at least in part on a speed of the gesture along the earlier portion of the single trajectory and a speed of the gesture along the later portion of the single trajectory, the user input being determined independent of a location corresponding to the series of points touching the surfaces; and execute one or more actions based on the user input.

14. The device of claim 13, wherein the gesture is identified using a proximity sensor, camera, or touch sensor of the device.

15. The device of claim 13, wherein:
the gesture comprises a pulling gesture on and then away from one of the surfaces at a first location of the one of the surfaces; and
the actions comprise:
selecting a user interface (UI) object within a display of the computing device at a first point within the display corresponding to the first location; and
adjusting a user-controllable parameter of an application on the computing device indicated by the UI object based on a distance of an end point of the pulling gesture away from the one of the surfaces.

16. The device of claim 13, wherein the user-controllable parameter is a speaker volume or a display brightness.

17. The device of claim 13, wherein:
the gesture is a fly-away gesture; and
the actions comprise:
selecting a scrollable user interface (UI) object at or near a starting point of the fly-away gesture; and
scrolling the scrollable UI object at a speed based at least in part on a velocity of the fly-away gesture.

18. The device of claim 13, wherein the computing device is a mobile computing device.

* * * * *